(12) United States Patent
Sun

(10) Patent No.: US 8,070,125 B2
(45) Date of Patent: Dec. 6, 2011

(54) STORAGE DEVICE MOUNTING APPARATUS

(75) Inventor: Zheng-Heng Sun, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/851,526

(22) Filed: Aug. 5, 2010

(65) Prior Publication Data

US 2011/0266405 A1 Nov. 3, 2011

(30) Foreign Application Priority Data

Apr. 28, 2010 (CN) .......................... 2010 1 0158927

(51) Int. Cl.
*H05K 5/00* (2006.01)
(52) U.S. Cl. .................. 248/560; 248/225.11; 248/27.1; 248/694; 361/679.33; 360/97.01; 312/332.1; 312/223.2
(58) Field of Classification Search .................. 248/560, 248/27.1, 222.11, 225.11, 309.1, 221.11, 248/222.14, 222.41, 223.41, 694, 544, 229.11, 248/231.31, 223.31; 361/679.33, 679.34; 360/97.01; 312/332.1, 223.2, 333
See application file for complete search history.

(56) References Cited

U.S. PATENT DOCUMENTS

| | | | | |
|---|---|---|---|---|
| 7,441,744 B2 * | 10/2008 | Chen et al. | ..................... | 248/694 |
| 7,684,182 B2 * | 3/2010 | Zhang et al. | ............. | 361/679.33 |
| 7,848,096 B2 * | 12/2010 | Peng et al. | ............... | 361/679.33 |
| 7,864,522 B1 * | 1/2011 | Peng et al. | ............... | 361/679.33 |
| 2007/0025014 A1 * | 2/2007 | Kim | ........................... | 360/97.01 |
| 2011/0103000 A1 * | 5/2011 | Sun | ........................... | 361/679.33 |
| 2011/0121146 A1 * | 5/2011 | Sun | ............................... | 248/201 |

* cited by examiner

*Primary Examiner* — Anita M King
(74) *Attorney, Agent, or Firm* — Altis Law Group, Inc.

(57) ABSTRACT

A mounting apparatus includes a bracket, fasteners, and a positioning member. The bracket includes an end member, and a pair of side plates perpendicular to the end member. The positioning member is pivotably attached to the end member. A pair of mounting holes is defined in each side plate. Each mounting hole includes an entry portion extending through an edge portion of the side plate, and a locating portion communicating with the entry portion. The entry portion is closer to the end member than the locating portion. The fasteners are attached to two sidewalls of a storage device. Each fastener includes a gasket received in the entry portion of a mounting hole to abut against the storage device. The positioning member is pivoted to abut against the storage device when the gaskets move from the entry portions to the locating portions of the mounting holes.

7 Claims, 3 Drawing Sheets

STORAGE DEVICE MOUNTING APPARATUS

BACKGROUND

1. Technical Field

The present disclosure relates to a storage device mounting apparatus.

2. Description of Related Art

An electronic device, such as a computer, generally includes a bracket to fix a storage device, such as a hard disk drive (HDD), or a compact disk read-only memory (CD-ROM) drive. The storage device is directly inserted into the bracket, and a number of fasteners extend through sidewalls of the bracket to engage in the storage device. However, during operation, vibrations generated by the storage device may cause the storage device to strike against the bracket and cause an annoying sound.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The present disclosure, including the accompanying drawings in which like references indicate similar elements, is illustrated by way of examples and not by way of limitation. It should be noted that references to "an" or "one" embodiment in this disclosure are not necessarily to the same embodiment, and such references mean at least one.

Figure 1:
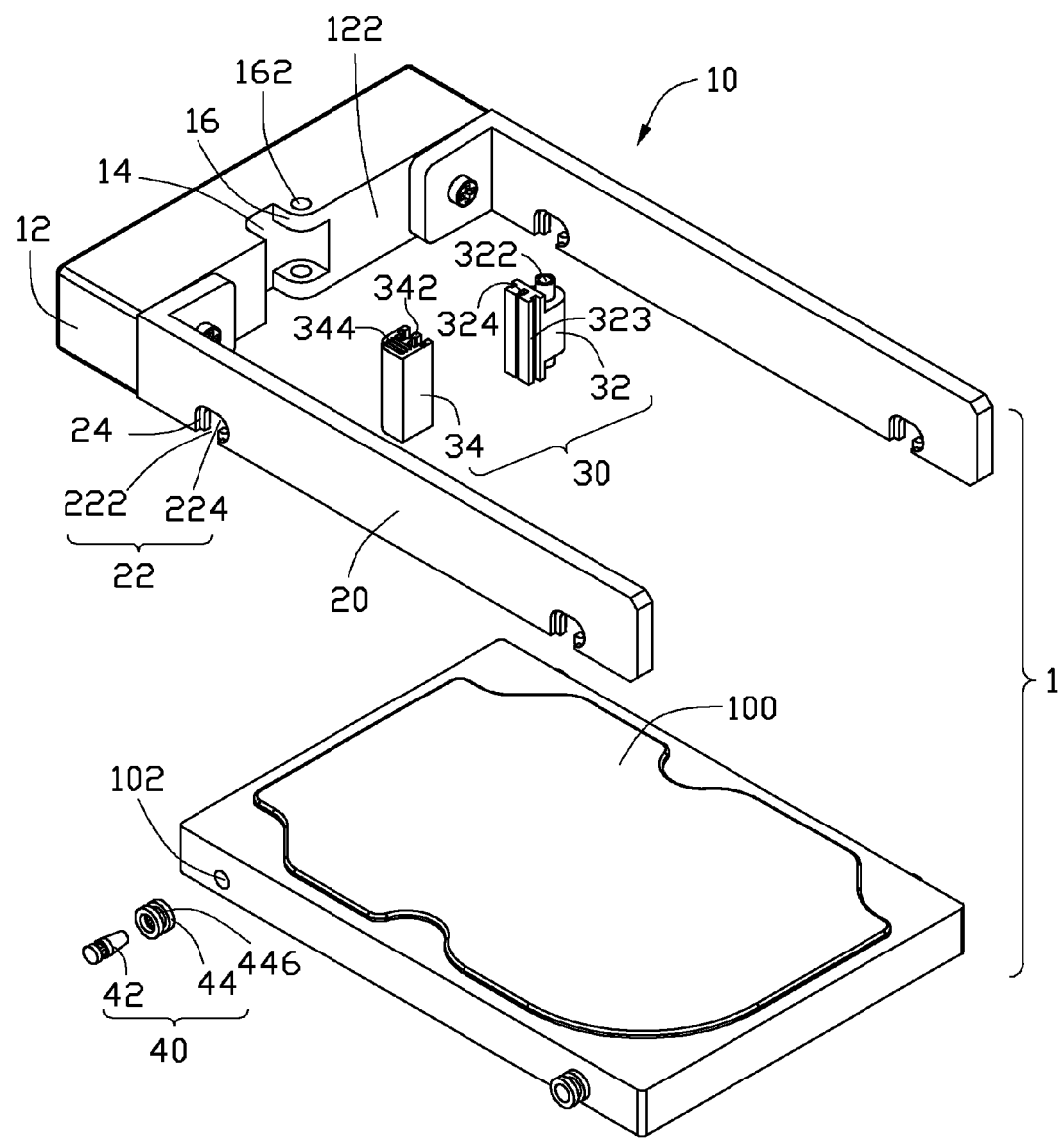
FIG. 1 is an explored, isometric view of an exemplary embodiment of a mounting apparatus together with a storage device.
Figure 2:
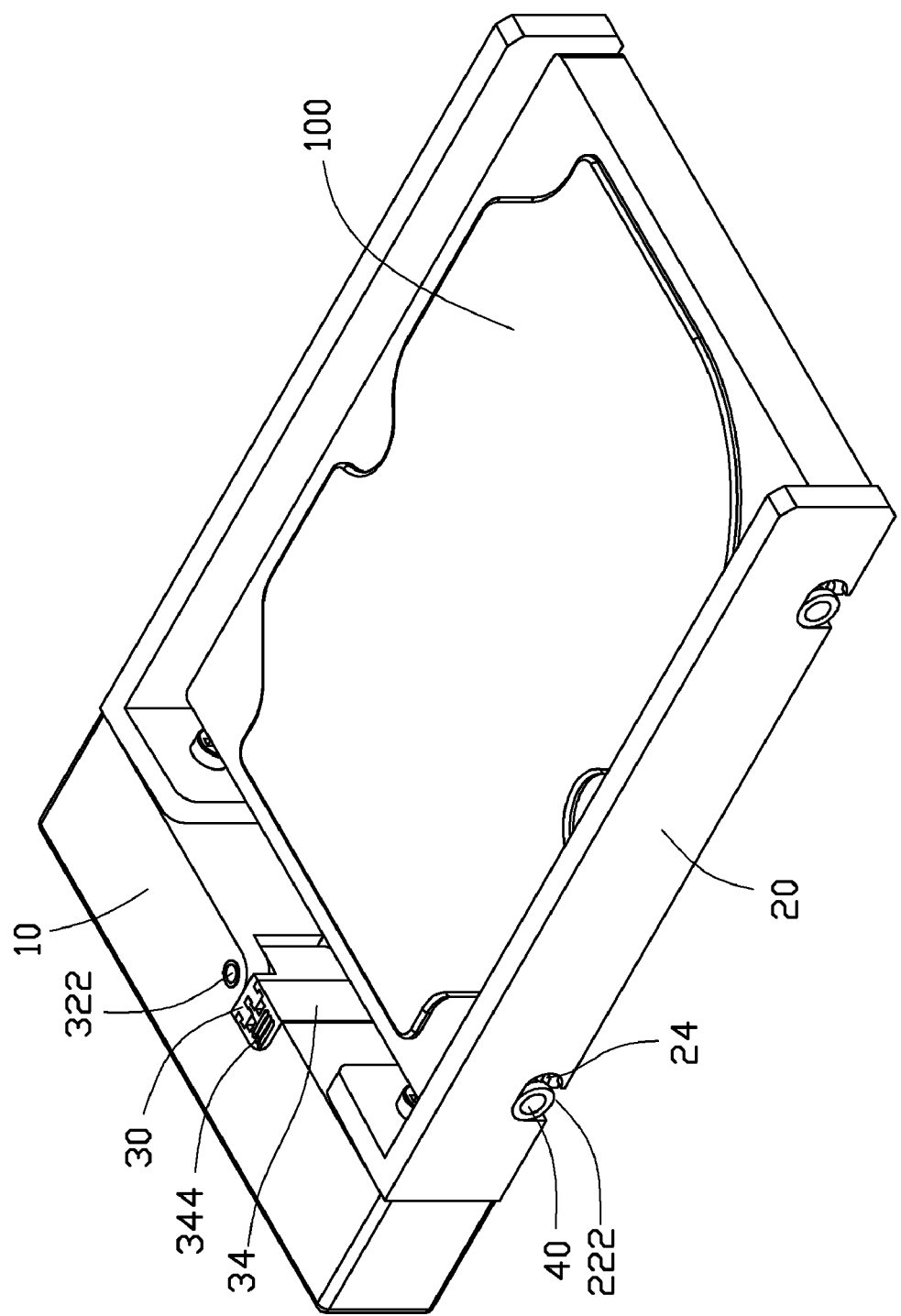
FIG. 2 is an assembled, isometric view of the mounting apparatus and the storage device of FIG. 1, showing the storage device in an unlocked state.
Figure 3:
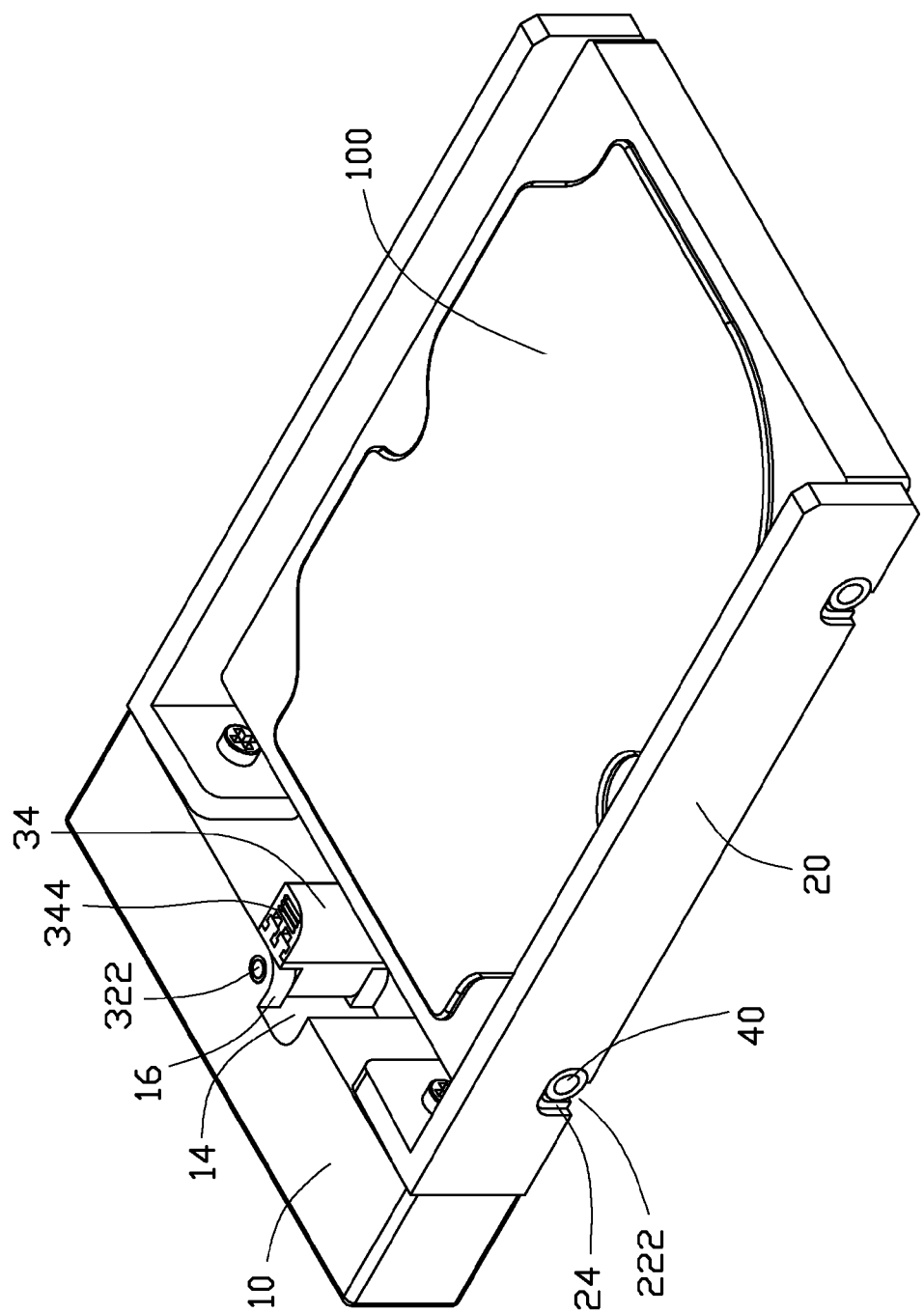
FIG. 3 is similar to the FIG. 2, showing the storage device in a locked state.

Referring to FIG. 1, an exemplary embodiment of a mounting apparatus is for mounting a storage device 100 and includes a bracket 10, a plurality of fasteners 40, and a positioning member 30.

The bracket 10 includes an end member 12, and a pair of side plates 20 perpendicularly attached to a rear wall 122 of the end member 12. A pair of spaced tabs 16 is formed in the rear wall 122 of the end member 12. A receiving space 14 is defined in the end member 12 beside the tabs 16. A pair of pivoting holes 162 in vertical alignment is respectively defined in the tabs 16. A pair of mounting holes 22 is defined in each of the side plates 20. Each mounting hole 22 includes a straight entry portion 222 extending through an edge portion of the side plate 20, and a circular locating portion 224 communicating with the entry portion 222. The entry portion 222 is closer to the end member 12 than the locating portion 224. A protrusion 24 extends from a middle of the inside wall of the mounting hole 22.

Each of the fasteners 40 includes a pin 42, and a resilient gasket 44 fixed around the pin 44. The gasket 44 is made of vibration absorbing material and includes an annular groove 446 circumferentially defined in the outside thereof.

The storage device 100 includes a pair of fixing holes 102 defined in each of two opposite sidewalls thereof.

The positioning member 30 includes a first body 32, and a second body 34 connected to the first body 32. The first body 32 is capable of being sandwiched between the two tabs 16 of the bracket 10 and includes a pair of shafts 322 extending from two opposite ends thereof to engage in the pivoting holes 162 of the tabs 16, and a block 323 extending from a side thereof. The block 323 includes a plurality of vertical slots 324 defined therein. The second body 34 is made of vibration absorbing material. The second body 34 includes a plurality of bars 342 extending from a side thereof to engage in the slots 324 of the first body 32, and an operating wall 344 with a plurality of ridges formed thereon.

In assembly, the pins 42 of the fasteners 40 extend into the fixing holes 102 of the storage device 100, with the gaskets 44 fixed in place around the pins 42 and abutting against the corresponding sidewalls of the storage device 100. The positioning member 30 is pivotably attached to the end member 12 of the bracket 10, with the shafts 322 engaging in the pivoting holes 162 of the tabs 16, the bars 342 of the second body 34 engaging in the slots 324 of the first body 32, and the second body 34 received in the receiving space 14 of the bracket 10. The storage device 100 is sandwiched between the side plates 20 of the bracket 10, with the gaskets 44 of the fasteners 40 located in the entry portions 222 of the mounting holes 22, and the protrusions 24 of the mounting holes 24 engaging in the annular grooves 446 of the gaskets 44. The storage device 100 is driven in a direction away from the end member 12 so that the gaskets 44 of the fasteners 40 move into the locating portions 224 from the entry portions 222 of the mounting holes 22. The positioning member 30 is pivoted toward the storage device 100 by operating the operating wall 344, and the second body 34 is pivoted out from the receiving space 14 to abut against the front of the storage device 100. Thus, the storage device 100 is mounted in the bracket 10.

It is to be understood, however, that even though numerous characteristics and advantages of the present disclosure have been set forth in the foregoing description, together with details of the structure and function of the present disclosure, the present disclosure is illustrative only, and changes may be made in details, especially in matters of shape, size, and arrangement of parts within the principles of the present disclosure to the full extent indicated by the broad general meaning of the terms in which the appended claims are expressed.

What is claimed is:

1. A mounting apparatus for mounting a storage device, the mounting apparatus comprising:

a bracket comprising an end member, and a pair of side plates perpendicular to the end member for sandwiching the storage device therebetween, a plurality of mounting holes defined in each of the pair of side plates, each of the plurality of mounting holes comprising an entry portion extending through an edge portion of the side plate, and a locating portion communicating with the entry portion, the entry portion being closer to the end member than the locating portion;

a plurality of fasteners capable of being attached to two opposite sidewalls of the storage device and each of the plurality of fasteners comprising a pin for engaging in the sidewalls, and a vibration absorbing gasket fixed around the pin, the gasket operable to be received in the mounting holes of the bracket and abutting against the sidewalls; and a positioning member pivotably attached to the end member and capable of abutting against a portion of the storage device adjacent to the end member when the gaskets of the fasteners move into the locating portions from the entry portions of the mounting holes of the bracket.

2. The mounting apparatus of claim 1, wherein a protrusion extends from a middle of an inside wall of each of the plurality of mounting holes, and an annular groove is defined in each gasket to engage with the protrusion.

3. The mounting apparatus of claim 1, wherein the entry portion is straight and the locating portion is circular.

4. The mounting apparatus of claim 2, wherein the positioning member comprises a first body pivotably attached to the end member, and a second body connected to the first body, the second body is made of vibration absorbing material.

5. The mounting apparatus of claim 4, wherein the end member comprises a pair of spaced tabs each defining a pivoting hole, the first body is sandwiched between the tabs, a pair of shafts extends from two opposite ends of the first body to engage in the pivoting holes.

6. The mounting apparatus of claim 5, wherein the end member comprises a receiving space defined beside the tabs for receiving the second body therein.

7. The mounting apparatus of claim 4, wherein the first body comprises a block extending from a side thereof with a plurality of slots, the second body comprises a plurality bars to engage in the slots.

* * * * *